United States Patent [19]
Arbetter

[11] Patent Number: 5,189,841
[45] Date of Patent: Mar. 2, 1993

[54] UNITARY WINDOW FRAMES AND SASHES

[75] Inventor: Michael Arbetter, Greensburg, Pa.

[73] Assignee: Francine Arbetter, Yardley, Pa.

[21] Appl. No.: 195,307

[22] Filed: May 18, 1988

[51] Int. Cl.⁵ .............................................. E06B 7/16
[52] U.S. Cl. ................................. 49/504; 49/DIG. 2
[58] Field of Search ................. 49/504, DIG. 2, 502, 49/404, 401; 52/309.13, 309.2

[56] References Cited

U.S. PATENT DOCUMENTS

| | | | |
|---|---|---|---|
| 2,753,603 | 7/1956 | Strawther | 49/DIG. 2 |
| 3,352,060 | 11/1967 | Thams | 49/DIG. 2 |
| 3,843,982 | 10/1974 | Lane et al. | 49/DIG. 2 |
| 4,333,283 | 6/1982 | Ebata | 49/DIG. 2 |
| 4,553,364 | 11/1985 | Legg et al. | 49/DIG. 2 |

Primary Examiner—Kenneth J. Dorner
Assistant Examiner—Gerald A. Anderson

[57] ABSTRACT

A window assembly comprises frame and sash members that are each one-piece of integrally-molded plastic material. The frame and sash members are each molded by delivering molten plastic to respective mold cavities defined between outer and inner multiple-member rectangular sub-assemblies. Different size frames and sashes are formed by inserting/removing inner and outer extension members of appropriate length from the mold sub-assemblies.

12 Claims, 3 Drawing Sheets

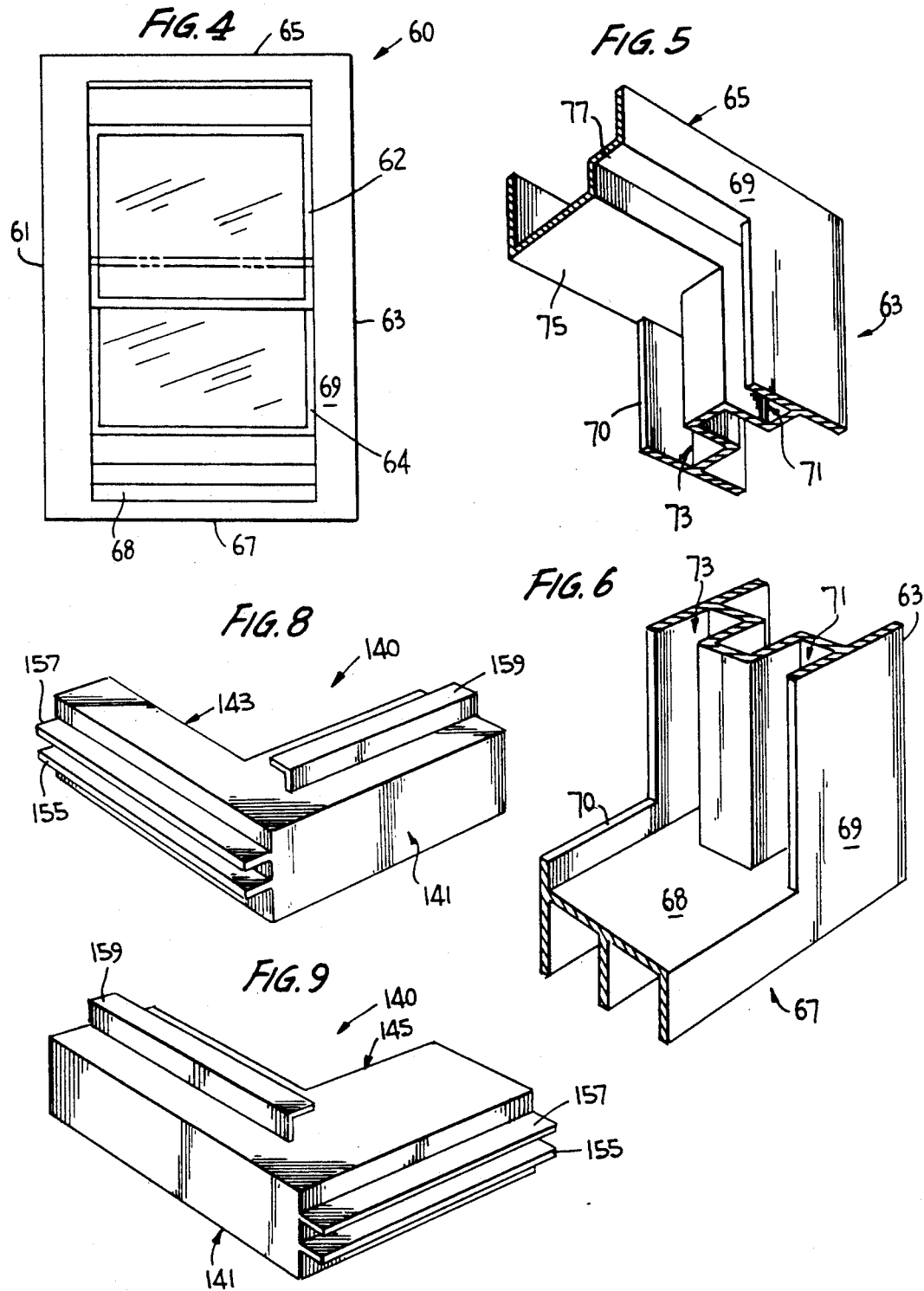

UNITARY WINDOW FRAMES AND SASHES

BACKGROUND OF THE INVENTION

1. Technical Field

The present invention relates to windows for building structures and to methods and apparatus for fabricating such windows.

2. Discussion of the Prior Art

Windows having wooden frames and sashes are the most commercially popular type of window structure but are known to suffer badly from exposure to the elements. Wooden frames may be clad or coated with weather-proofing material; however, this adds considerable cost to an already expensive product. Metal frames and sashes have also been used for windows and are more resistant to deterioration from exposure to the elements. However, metal is a good conductor of thermal energy and must be used in conjunction with thermal breaks to insulate against thermal conduction between the exterior and the interior of the building via the window frame and sashes. The thermal break complicates fabrication of the windows and adds considerably to the overall expense.

Plastic window frames and sashes have been attempted in the prior art, as exemplified by the disclosure in U.S. Pat. No. 4,328,644 (Scott et al). The frames and sashes are constructed from individually-extruded top, bottom and side sections which are cut to the desired length and then secured together by means of screws, welding, etc., at the frame and sash corners. The assembly cost for such windows is quite large, particularly in view of the possibility that individual sections may not be properly cut or processed. In addition, the corner joints of the extruded sections are subject to racking and penetration by air and water.

OBJECTS AND SUMMARY OF THE INVENTION

It is therefore an object of the present invention to provide plastic window frame and sash structures that are simple and inexpensive to fabricate.

It is another object of the present invention to provide weather-resistant plastic window frames and sashes that require negligible assembly time and cost.

A further object of the present invention is to provide plastic window frame and sash structures that are free of the problems associated with frames and sashes conventionally constructed of individually extruded top, side and bottom sections.

It is also an object of the present invention to provide an improved method and apparatus for fabricating plastic window frames and sashes.

In accordance with the present invention each plastic window frame and sash is molded as an integral or unitary member so that there are no separate extruded sections to be assembled. The molten plastic material can be mixed with an appropriate pigment prior to molding to provide a solid frame or sash having uniform color throughout its thickness, not merely as a coating. The absence of corner joints avoids water and air penetration and minimizes torsional distortion, while the unitary plastic structure precludes thermal transfer through the window without the need for separate thermal breaks.

The plastic material may be poured (i.e., under pressure or gravity fed), layered, sprayed, etc., into a mold cavity defined between outer and inner sub-assemblies, each of which is provided in multiple sections so as to be expandable with inserts along each of its sides to thereby permit fabrication of frames and sashes of different sizes. A wide variety of plastic materials can be employed as long as the material has a reasonably short setting time (e.g., between 20 and 60 seconds) and, when set, has structural and chemical characteristics consistent with window frame and sash utilization. Examples of suitable materials are polyether, polyol, diisocyanate, prepolymer (ester blend), and fiberglass.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 4 is a front view in elevation (i.e., from the window exterior) of a unitary plastic window formed from the mold assemblies of FIG. 1 and FIG. 7;

FIG. 5 is a view in perspective of one corner of the window of FIG. 4;

FIG. 6 is a view in perspective of a second corner of the window of FIG. 4;

FIG. 8 is a view in perspective of one corner of a unitary window sash molded from the assembly of FIG. 7;

FIG. 9 is a view in perspective of a second corner of the unitary window sash molded from the assembly of FIG. 7;

DESCRIPTION OF THE PREFERRED EMBODIMENT

Figure 1:
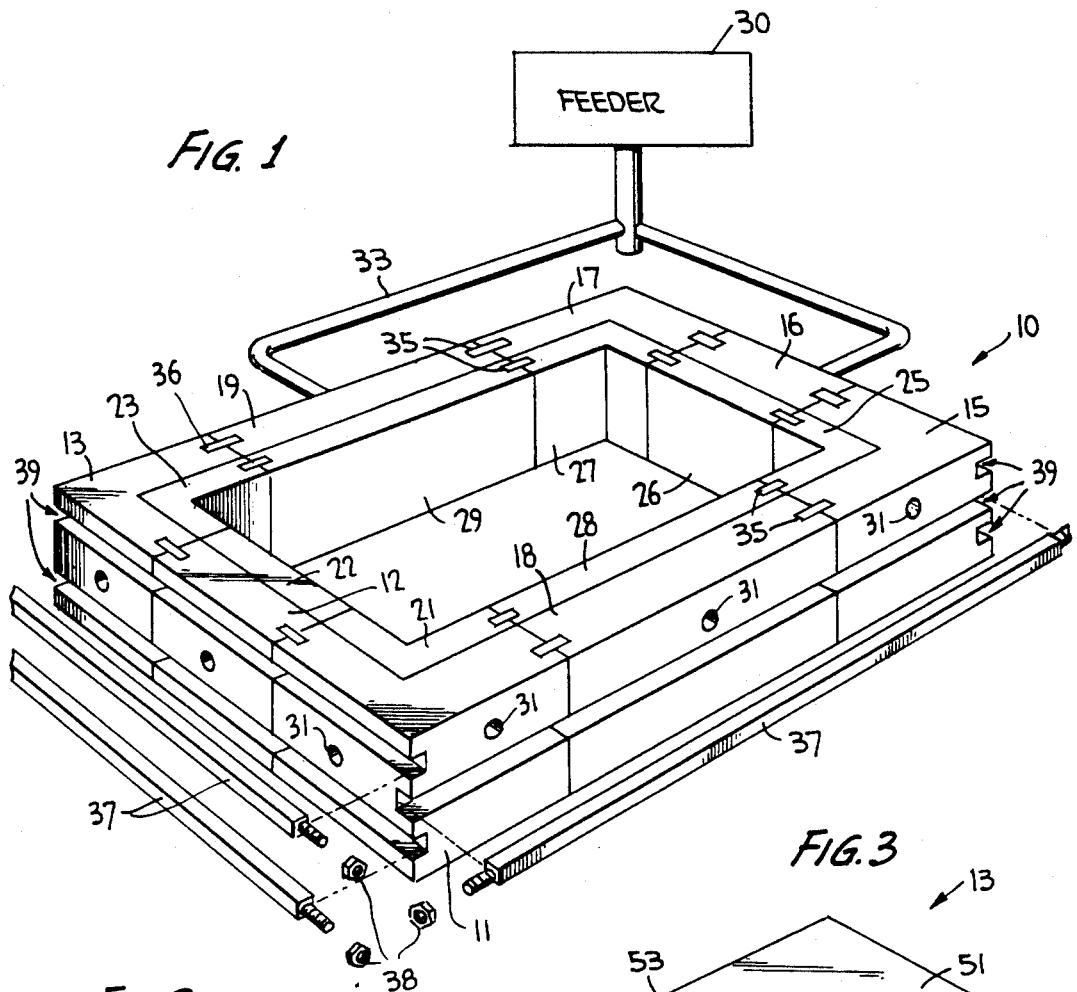
FIG. 1 a diagrammatic view in perspective of a mold assembly utilized to mold a unitary window frame in accordance with the present invention.

Referring to FIG. 1 of the accompanying drawings, a mold assembly 10 for fabricating an integral or unitary plastic window frame according to the present invention includes a rectangular outer sub-assembly and a rectangular inner sub-assembly. In the illustrated embodiment each of the inner and outer sub-assemblies includes eight members. Specifically, the outer sub-assembly includes a right sill and jamb outer corner member 11, a left sill and jamb outer corner member 13, and a sill outer extension member 12 disposed therebetween. The outer sub-assembly further includes a right head and jamb outer corner member 15, a left head and jamb outer corner member 17 and a head outer extension member 16 disposed therebetween. A right jamb outer extension member 18 is disposed between right sill and jamb outer corner member 11 and right head and jamb outer corner member 15; left jamb outer extension member 19 is disposed between left sill and jamb outer corner member 13 and right head and jamb outer corner member 17. The outer mold members, when assembled for use, are positioned in abutting end-to-end relation in a closed rectangular path in the following sequence: members 11, 12, 13, 19, 17, 16, 15, 18 and back to 11.

The inner sub-assembly includes a right sill and jamb inner corner member 21, a left sill and jamb inner corner member 23 and a sill inner extension member 22 disposed therebetween. The inner assembly also includes a right head and jamb inner corner member 25, a left head and jamb inner corner member 27 and a head inner extension member 26 disposed therebetween. A right jamb inner extension member 28 is disposed between members 21 and 25 a left jamb inner extension member 29 is disposed between members 23 and 27. The inner mold members, when assembled for use, are positioned in abutting end-to-end relation in a closed rectangular path in the following sequence: members 21, 22, 23, 29, 27, 26, 25, 28, and back to 21.

The inner mold members have their radially outer surfaces facing and adjacent the radially inner surfaces of a corresponding outer mold member with which it is paired, the members being paired as follows: members 11 and 21; 12 and 22; 13 and 23; 19 and 29; 17 and 27; 16 and 26; 15 and 25; and 18 and 28. The facing surfaces of paired inner and outer mold members are contoured with channels, passages and recesses to define corresponding parts of a mold cavity for forming the unitary window frame molded from assembly 10, the facing surface configurations being illustrated in FIGS. 2 and 3. Each of the mold members is individually removable from the mold assembly.

A supply 30 of molten plastic material is provided to deliver the material to a cavity in mold assembly 10 via various conduits 33 which may be flexible tubing. The distal ends of the tubing sealingly engage or attach to supply ports 31 provided in the outside surface of each of the outer mold members in a conventional manner. Alternatively, the supply ports may be defined in the mold inner members, or in both of the inner and outer members, or in any desired combination of outer and inner members. As is typical in molds of this type, air exhaust slots or ports (not shown) are provided to prevent formation of air bubbles in the molded frame. The delivered molten plastic material may be caused to flow from feeder 30 to the mold assembly 10 by gravity feed or by applied pressure in any conventional manner. Moreover, the delivered molten plastic material may include two or more components that are mixed as they are delivered simultaneously to the mold, again in a conventional manner.

Adjacent mold members are held in place during a molding procedure by means of clamps, straps, etc., diagrammatically illustrated and represented by reference numeral 35. Alternatively, or in addition, the mold may be held together by assembly rods 37 threaded at each end and peripherally contoured to fit in suitably provided longitudinal-aligned channels 39 defined in an outer surface of the outer mold members. The ends of the assembly rod 37 are threadedly engaged by nuts 38 that are tightened against the outer mold corner members to hold all of the outer mold members in place. Other conventional means for holding the members in place may also be employed.

The paired sill insert members 12, 22, head insert members 16, 26, left jamb insert members 19, 29 and right jamb insert members 18, 28 are provided, or not, in accordance with the size of the unitary window frame to be molded. For the smallest frame capable of being molded by assembly 10, all of these insert members are removed. It may be noted, however, that the inner mold sub-assembly can not be easily removed from the molded product if only four corner members are employed without inserts. It may be desirable, therefore, to always have at least one insert member on each side of the inner mold sub-assembly. Of course, depending upon the configuration of the molded product, it may be possible to remove the inner sub-assembly corner member by flexure of the molded product without the need for the insert members. For unitary window frames of different sizes, the insert members are provided in appropriate lengths.

The plastic material utilized in conjunction with mold assembly 10 is chosen on the basis of its setting time, its ability to accept pigmentation, and on the structural and chemical characteristics of the material. Fiberglass, polyether polyol, and di-isocyanate prepolymer (ester blend), are some examples of useful materials. A particularly useful material is the product marketed by Freeman Chemical Corporation of Port Washington, Wis. under the trademark CHEMPOL 35-0301. This material had the following characteristics: tensile strength—from 7,300 psi to 13,500 psi over a temperature range of 140° F. to minus 40° F.; compressive strength—9200 psi at 73° F.; shear strength—5300 psi at 73° F.; thermal conductivity—1.07 BTU per inch per square foot per ° F. per hour; specific gravity—1.16 grams per cubic centimeter; coefficient of expansion—$5.8 \times 10^{-5}$ inches per inch of length per ° F.; set-up time—20 to 60 seconds; colorability—can be used with pigment paste to match virtually any color; pour temperature—components at 70° F. to 80° F., mold at 240° F.; viscosity—approximately 300 centipoises at 77° F. In addition, this material can be readily drilled and tapped.

Figure 2:
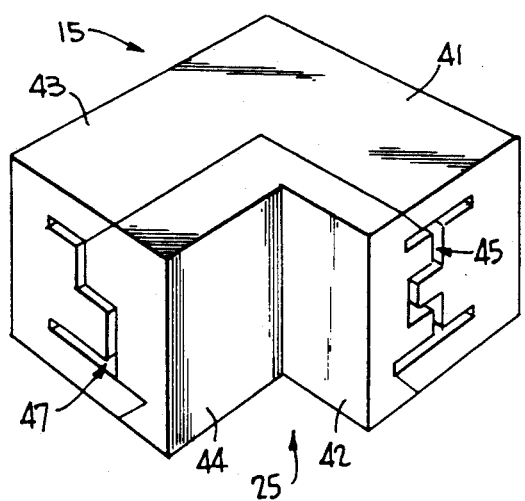
FIG. 2 is a view in perspective of one corner of the mold assembly of FIG. 1.

FIG. 2, to which specific reference is now made illustrates the right head and jamb outer corner member 15 and the right head and jamb inner corner member 25 of mold assembly 10. These paired mold members have their mutually presented surfaces contoured to define the upper right portion of the jamb and the right end portion of the head of the unitary frame molded by mold assembly 10. Specifically, outer corner member 15 has two mutually perpendicular legs 41 and 43, the inner surfaces of which face respective outer surfaces of mutually perpendicular legs 42 and 44, respectively, of inner corner member 25. The various channels, passages and recesses defined in the mutually presented surfaces of jamb legs 41 and 42 form part of the mold cavity and communicate with one or more inlet ports 31 (FIG. 1) to receive the molten plastic material. The particular contours of cavity sections 45 define the configuration of the jamb in the unitary frame, which configuration will vary for different window types and which is, therefore, not of itself a feature of the present invention. It is sufficient to note that the embodiment of mold assembly 10 illustrated in the drawings is intended to produce a unitary frame for a double hung window. There are various channels, passages and recesses 47 defined in the mutually presented surfaces of head legs 43 and 44 of members 15 and 25, respectively. These channels, passages and recesses also constitute cavity sections 47 and communicate with one or more inlet ports 31 and are configured to define the head portion of the unitary window frame molded from assembly 10.

Figure 3:
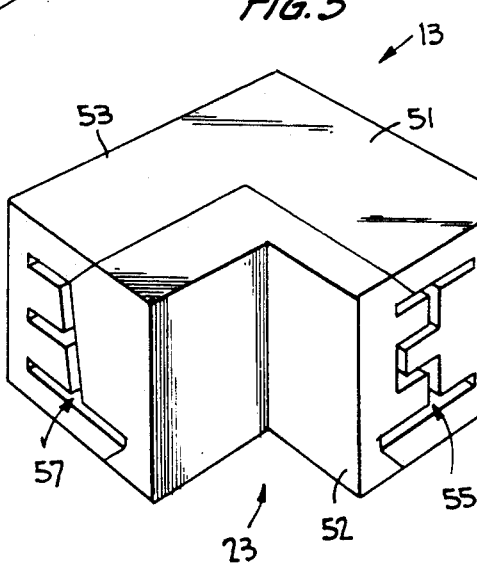
FIG. 3 is a view in perspective of another corner of the mold assembly of FIG. 1.

Referring to FIG. 3, the paired left sill and jamb outer corner member 13 and inner corner member 23 have their mutually presented surfaces contoured to define the lower left portion of the jamb and the left end portion of the sill of the unitary frame. Specifically, outer corner member 13 has two mutually perpendicular legs 51 and 53, the inner surfaces of which face respective outer surfaces of mutually perpendicular legs 52 and 54, respectively, of inner corner member 23. The various channels, passages and recesses defined in the mutually presented surfaces of jamb legs 51 and 52 constitute mold cavity sections 55 and communicate with one or more inlet ports 31 (FIG. 1) to receive molten plastic during a molding procedure. The particular contours of cavity sections 55 define the configuration of the jamb in the unitary frame and are substantially identical to the contours of the channels, passages and recesses 45 defined between jamb legs 41 and 42 in FIG. 2. There are various passages, channels and recesses defined in the mutually presented surfaces of sill legs 53 and 54 of members 13 and 23, respectively. These channels, passages and recesses constitute mold cavity sections 57 and also communicate with one or more inlet ports 31 and are configured to define the sill portion of the unitary frame.

It will be appreciated that left outer corner member 17 and left inner corner member 27 have mold cavity sections defined therebetween with the same configurations as the mold cavity sections 45 and 47 defined between outer member 15 and outer member 25, it being understood that members 17 and 27 are substantially mirror images of members 15 and 25, respectively. Likewise, the cavity sections defined between outer member 11 and inner member 21 are substantially the same as the cavity sections 55 and 57 defined between members 13 and 23, it being further understood that members 13 and 23 are substantially mirror images of members 11 and 21, respectively. Of course, it is possible, although unusual, to have jamb cross-sections of different configuration so that the jamb on the left side of the window differs from the jamb on the right side of the window. Under such unusual circumstances the cavity sections defined between the mold members will be configured accordingly.

The cavity sections defined between sill extension members 12 and 22 correspond to the cavity sections 57 defined between legs 53 and 54 of members 13 and 23, respectively. Likewise, the cavity sections defined between head extension members 16 and 26 are identical to the cavity sections 47 defined between legs 43 and 44 of members 15 and 25, respectively. The cavity sections defined between the right jamb extension members 18 and 28 correspond to, and are continuations of, the cavity sections 55 defined between legs 41 and 42 of members 15 and 25, respectively. In a similar manner, the cavity sections defined between left jamb extension members 19 and 29 correspond to the jamb cavity sections defined between members 13 and 23.

Referring now to FIGS. 4, 5 and 6 of the accompanying drawings, an integral or unitary window frame structure 60 fabricated from mold assembly 10 of FIG. 1, includes left and right jambs 61, 63, head 65 and sill 67, all integrally formed as a unitary molded product. The exterior surface 69 of the frame is flat and rectangular with the width at its jamb portions being slightly greater than the height at its head and sill portions for this particular window embodiment. The sill 67 has a surface 68 that slopes upwardly toward the interior side of the frame and terminates in the bottom or sill portion of the rectangular interior surface 70 of the frame. Each jamb has two vertical tracks, 71, 73 defined therein for respective sashes of 62, 64 of a double hung window. In the illustrated embodiment the portion 75 of head 65 corresponding to the location of track 73 projects to a lower level than does the portion 77 of head 65 disposed in depth registration with track 71. It will be understood that corresponding channels are provided in the opposite jamb member. It is also understood, and conventional, that the channels normally contain balances and tilt latches.

Although a particular structure is illustrated in FIGS. 4, 5 and 6 for the unitary window frame produced by mold assembly 10, it is to be understood that such frame is illustrated for purposes of example only and that substantially any window frame structure, consistent with the formation of a unitary or integral mold, maybe employed and constructed in accordance with the principles of the present invention.

Figure 7:
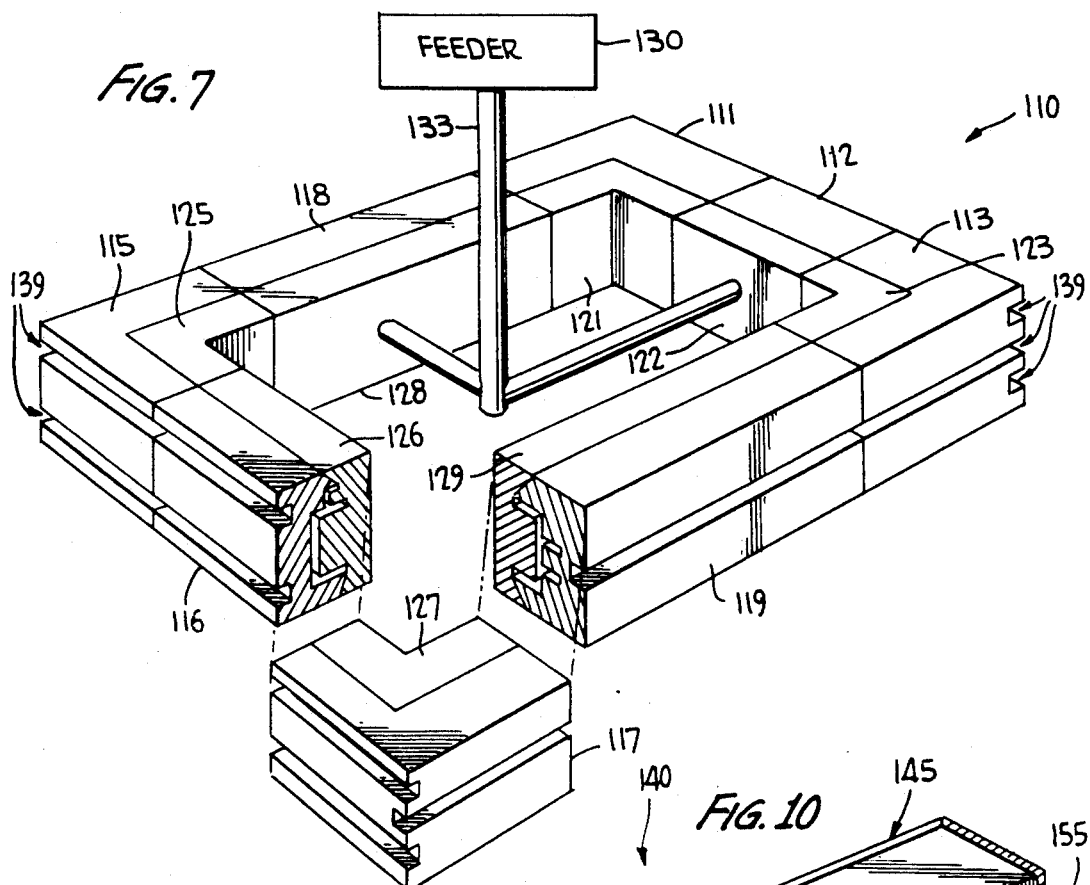
FIG. 7 is a diagrammatic view in perspective of a mold assembly employed to fabricate a unitary window sash in accordance with the principles of the present invention.
Figure 10:
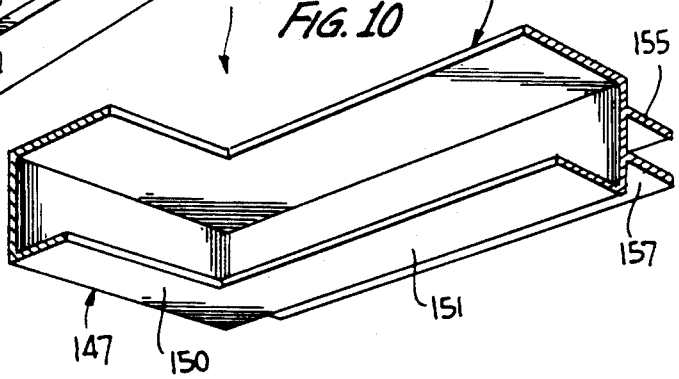
FIG. 10 is a view in perspective of another corner of the unitary window sash molded from the mold assembly of FIG. 7.
Figure 11:
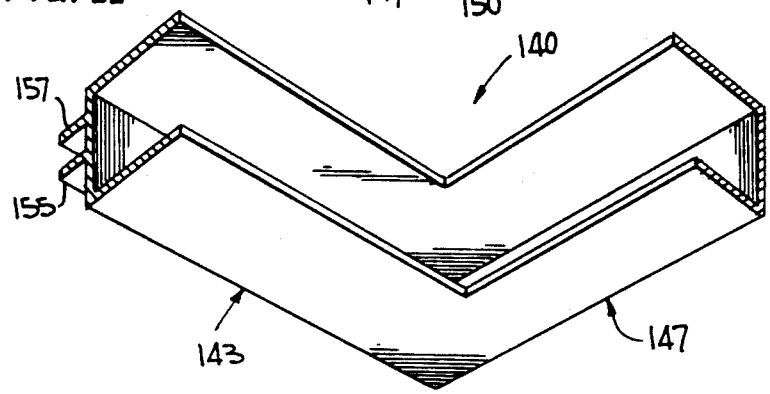
FIG. 11 is a view in perspective of still another corner of the unitary window sash molded from the assembly of FIG. 7.

Referring now to FIG. 7 of the accompanying drawings, a mold assembly 110 for fabricating an integral or unitary plastic window sash, such as sash 62 or sash 64 according to the present invention includes a rectangular outer sub-assembly and a rectangular inner sub-assembly. In the illustrated embodiment each of the inner and outer sub-assemblies includes eight members. Specifically, the outer sub-assembly includes a right bottom and side outer corner member 111, a left bottom and side outer corner member 113 and a bottom outer extension member 112 disposed therebetween. The outer sub-assembly further includes a right top and side outer corner member 115, a left top and side outer corner member 117 and a top extension member 116 disposed therebetween. A right side outer extension member 118 is disposed between the members 111 and 115; a left side outer extension member 119 is disposed between the members 113 and 117. The outer mold members of the sash assembly 110, when assembled for use, are positioned in abutting end-to-end relation in a closed rectangular path in the following sequence: members 111, 112, 113, 119, 117, 116, 115, 118 and back to member 111.

The inner sub-assembly of the sash mold assembly 110 includes a right bottom and side inner corner member 121, a left bottom and side inner corner member 123 and a bottom inner extension member 122 disposed therebetween. The inner assembly further includes a right top and side inner corner member 125, a left top and side inner corner member 127 and a top inner extension member 126 disposed therebetween. A right side inner extension member 128 is disposed between members 121 and 125; a left inner side extension member 129 is disposed between members 123 and 127. The inner mold members, when assembled for use, are positioned in abutting end-to-end relation in a closed rectangular path in the following sequence: members 121, 122, 123, 129, 127, 126, 125, 128 and back to 121.

The inner mold members of the sash sub-assembly have their radially outer surfaces facing and adjacent the radially inner surfaces of a corresponding outer mold member with which it is paired, the members being paired as follows: member 111 and 121; 112 and 122; 113 and 123; 119 and 129; 117 and 127; 116 and 126; 115 and 125; and 118 and 128. The facing surfaces of paired inner and outer mold members are contoured with channels, passages and recesses to define corresponding sections of a mold cavity for forming parts of the unitary window sash molded from assembly 110, the facing surface configurations being illustrated in FIG. 7 between paired members 116 and 126 and between paired members 119 and 129. Each of the mold members maybe individually removed from assembly 110.

A supply or feeder 130 of molten plastic material is provided to deliver material to mold cavity in assembly 110 via various conduits 133 which may be flexible tubing. The distal ends of the tubing sealingly engage or attach to supply ports provided on the inner surface of each of the inner mold members in a conventional manner. As described above in connection with the frame mold assembly 10, the supply ports may be defined in the mold outer members, or in both the inner and outer members, or in any desired combination of the outer and inner members. The delivery of molten plastic maybe caused to flow from feeder 130 to the mold assembly 110 by gravity feed, or by applied pressure in any conventional manner.

The adjacent mold members are held in place during a molding procedure by the same means described above in relation to mold assembly 10.

Mold assembly 110 produces a unitary, integrally-molded sash unit of the type depicted in FIGS. 8, 9, 10 and 11. It must be stressed that the particular sash configuration illustrated in these drawings is but one of substantially infinite different unitary sash configurations that may be fabricated in accordance with the principles of the present invention. It is also to be understood that, although the unitary sash is shown in the form of different corner sections in FIGS. 8, 11 for purposes of simplicity and understanding, the sash is actually an integrally-molded unit.

Referring now to FIGS. 8-11 of the accompanying drawings, a lower sash 140 includes a top 141, a right side 143, a left side 145 and a bottom 147, each of the top, sides and bottom of the sash are configured to form a channel defining a rectangular frame for receiving appropriate glazing material. In this regard the interior-facing side portion 150 of bottom 147, and the interior-facing portion 151 of side 145, are radially foreshortened to facilitate insertion of a glazing panel into the channels. The glazing panel can then be secured in the channels in a conventional manner, such as by a glazing wedge, a glazing bead, etc. The outer surfaces of the sides 143, 145 of the sash are each provided with vertically-extending parallel flanges 155, 157 arranged to slidably fit in respective tracks 71, 73 (see FIGS. 5, 6) of the jambs in window frame 60. The space between flanges 155, 157 is designed to accommodate the presence of the balance and tilt latch mechanisms in the tracks without interference. A channel 159 defined on the top portion 141 of the lower sash is adapted to engage a similar channel on the bottom portion of a corresponding upper sash when the final window is in its closed condition. In this regard the upper and lower sashes may be identical, or slightly modified to accommodate different requirements for the upper and lower sash functions.

Although the mold assemblies and resulting unitary frame and sash structures have been described and illustrated in terms of double hung windows, it is to be understood the casement windows, awning windows, sliding windows and corresponding type door structures may be fabricated in accordance with the principles of the present invention.

From the foregoing description it will be appreciated that the invention makes available a novel window assembly in which the frame and each sash are unitary-integrally molded structures requiring no assembly of side, bottom and top portions.

Having described a preferred embodiment of a new unitary window frame, a new unitary window sash, and methods and apparatus for fabricating the frame and sash, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A window assembly comprising a window frame and at least one window sash movably mounted in said frame, wherein said frame and sash are each molded as a respective single piece of plastic material, said single piece having an interior completely filled up with said plastic material without cavities and without any structural support members embedded therein.

2. The window assembly according to claim 1 wherein said window frame has a rectangular shape with opposing spaced jamb members each having at least one track defined therein in which said sash is movably mounted.

3. The window assembly according to claim 1 wherein said frame and sash are rectangular and are each molded by delivering molten plastic material into a mold cavity defined between concentrically arranged outer and inner mold sub-assemblies, said outer and inner mold sub-assemblies each including four corner members, and wherein the sizes of the frame and sash are determined by the length and/or number of straight extension members disposed between said corner members in each of said outer and inner mold sub-assemblies.

4. The window assembly according to claim 3 wherein said molten plastic is delivered to said mold cavity by gravity feed.

5. The window assembly according to claim 3 wherein said molten plastic is delivered to said mold cavity under pressure.

6. The window assembly according to claim 3 wherein said frame and sash are each molded by permitting the molten plastic material to set in the mold cavity and then separating individual members of the outer sub-assembly from individual members of the inner sub-assembly.

7. A window assembly comprising:
a continuous one-piece plastic member in the form of a window frame defining a window space entirely enclosed by said frame, said one-piece member having an interior completely filled with said plastic and having no cavities and no structural support members
at least one window sash movably mounted on said frame in said window space.

8. The window assembly according to claim 7 wherein said at least one window sash includes a continuous one-piece plastic sash frame.

9. The window assembly according to claim 7 wherein said window frame has a generally rectangular configuration with two end portions spaced longitudinally by first and second transversely spaced jamb portions, each jamb portion having an interior facing surface with the first longitudinally extending track defined therein, wherein the first track in said first jamb portion is transversely aligned with the first track in said second jamb portion, and wherein said one window sash is configured to be slidably received in said window space in said first track of said first and second jamb portions.

10. The window assembly according to claim 9 wherein said interior facing surfaces of said first and second jamb portions each have a second longitudinally-extending track defined therein, wherein said second track in said first jamb portion is transversely aligned with said second track in said second jamb portion, said assembly further comprising a second window sash configured to be slidably received in said window space in said second track of said first and second jamb portions.

11. The window assembly according to claim 10 wherein said first and second window sashes each include a continuous one-piece sash frame having an interior completely filled up with said plastic and having no cavities and no structural support members embedded therein.

12. A window assembly comprising a frame configured as a single piece of plastic material entirely enclosing a window space, said single piece having an interior completely filled with said plastic material and having no cavities and no structural support members embedded therein; and further comprising firs and second movably window sashes mounted on said frame in said window space, each window sash including a sash frame configured as a respective single piece of plastic material enclosing a respective sash space.

* * * * *